United States Patent [19]

Kreth et al.

[11] Patent Number: 4,739,617

[45] Date of Patent: Apr. 26, 1988

[54] CONTROL ARRANGEMENT FOR AT LEAST TWO HYDRAULIC CONSUMERS FED BY AT LEAST ONE PUMP

[75] Inventors: Norbert Kreth, Lohr/Main; Martin Schmitt, Goldbach; Armin Stellwagen, Lohr/Main, all of Fed. Rep. of Germany

[73] Assignee: Mannesmann Rexroth GmbH, Lohr/Main, Fed. Rep. of Germany

[21] Appl. No.: 921,735

[22] Filed: Oct. 22, 1986

[51] Int. Cl.⁴ ............................................... F16D 31/02

[52] U.S. Cl. ......................................... 60/426; 60/427; 91/517; 91/523

[58] Field of Search ......................... 60/484, 426, 427; 417/427, 286; 91/519, 523, 517, 534, 28

[56] References Cited

U.S. PATENT DOCUMENTS 3,747,472 7/1973 Knutson ............................ 91/519 X
4,024,710 5/1977 Zelle ...................................... 60/420
4,617,854 10/1986 Kropp ................................... 91/517

FOREIGN PATENT DOCUMENTS

2651325A1 8/1977 Fed. Rep. of Germany .
3422165A1 12/1984 Fed. Rep. of Germany .

*Primary Examiner*—Edward K. Look
*Attorney, Agent, or Firm*—Harness, Dickey & Pierce

[57] ABSTRACT

A pump supplies via in each case a directional valve a plurality of consumers with fluid, a pressure balance for load-independent division of the pump displacement being provided between each branch line branching off the pump delivery line and the directional valve. In a pressure regulating valve common to all pressure balances a control pressure is generated from the pressure difference between the pump pressure and the respective highest consumer pressure and is applied to all the pressure balances so that when the pump power is inadequate a proportional quantity reduction at all consumers is achieved.

14 Claims, 4 Drawing Sheets

CONTROL ARRANGEMENT FOR AT LEAST TWO HYDRAULIC CONSUMERS FED BY AT LEAST ONE PUMP

BACKGROUND OF THE INVENTION

The invention relates to a control arrangement for at least two hydraulic consumers fed by at least one pump having the features set forth in the preamble of claim 1.

It is known in such a control arrangement (DE-OS No. 3,422,165) to provide each pressure balance with two additional control chambers, the pump pressure being introduced into the one control chamber and the particular highest consumer pressure tapped off at a shuttle valve chain being introduced into the other control chamber. A pressure difference is obtained which acts on the control piston of each pressure balance and which maintains the pressure difference between load pressure and consumer pressure of the respective consumer in equilibrium. If the pressure difference of the pump pressure and the respective highest consumer pressure drops the flow through the pressure balances is proportionally reduced, i.e. in the ratio of the flow rate set at the directional valve, the path curve of a working medium to be moved caused for example by two simultaneously actuated servo cylinders being retained but the adjustment speed being however reduced.

The problem underlying the invention resides in improving the control arrangement of the type outlined at the beginning in such a manner that the construction is simplified, using series produced devices and the accuracy of the setting of the flow at the pressure balances is increased.

SUMMARY OF THE INVENTION

The aforementioned problem is solved according to the invention by the features set forth in the characterizing clause of claims 1 and 4.

The invention results in the advantage that by using a single valve for generating the control pressure the latter is the same at all the pressure balances. Furthermore, if it is desired to change the control pressure for all the consumers or loads it suffices to change the magnitude of the adjusting faces at the single pressure regulating valve and consequently reequipping of the individual pressure balances is eliminated. If the pressure regulating valve provided for all the pressure balances is attached directly to the pump, different flow losses in the tubes due to different flow rates have no effect on the control pressure supplied by the pressure regulating valve to the pressure balances.

Further advantageous developments of the invention are characterized in the subsidiary claims.

If the control pressure generated in the pressure regulating valve is applied to an actuator or adjustihg means associated with each of the pressure balances, then commercially available pressure balances can be used which are provided with an additional actuator. It is thus possible in this manner to incorporate subsequently the arrangement according to the invention in hydraulic control arrangements for several consumers which have a conventional load sensing system with pressure balance. In addition, in simple manner priorities can be achieved for specific consumers by omitting the actuator or adjusting means at these consumers.

If the control pressure is led to an additional control chamber of the pressure balance it is possible in order to reduce the control pressure at the pressure balance to obtain by means of an adjustable spring a fine adaptation of the flow rates.

Furthermore, according to the invention for the pressure regulating valve and such pressure balances a design is provided which permits a relatively simple construction so that stepped pistons can be dispensed with and in addition the danger of seizure of the pistons is reduced.

BRIEF DESCRIPTION OF THE DRAWINGS

Examples of embodiment will be explained in detail hereinafter with the aid of the drawings, wherein.

DETAILED DESCRIPTION OF THE PREFERRED EMBODIMENTS

Figure 1:
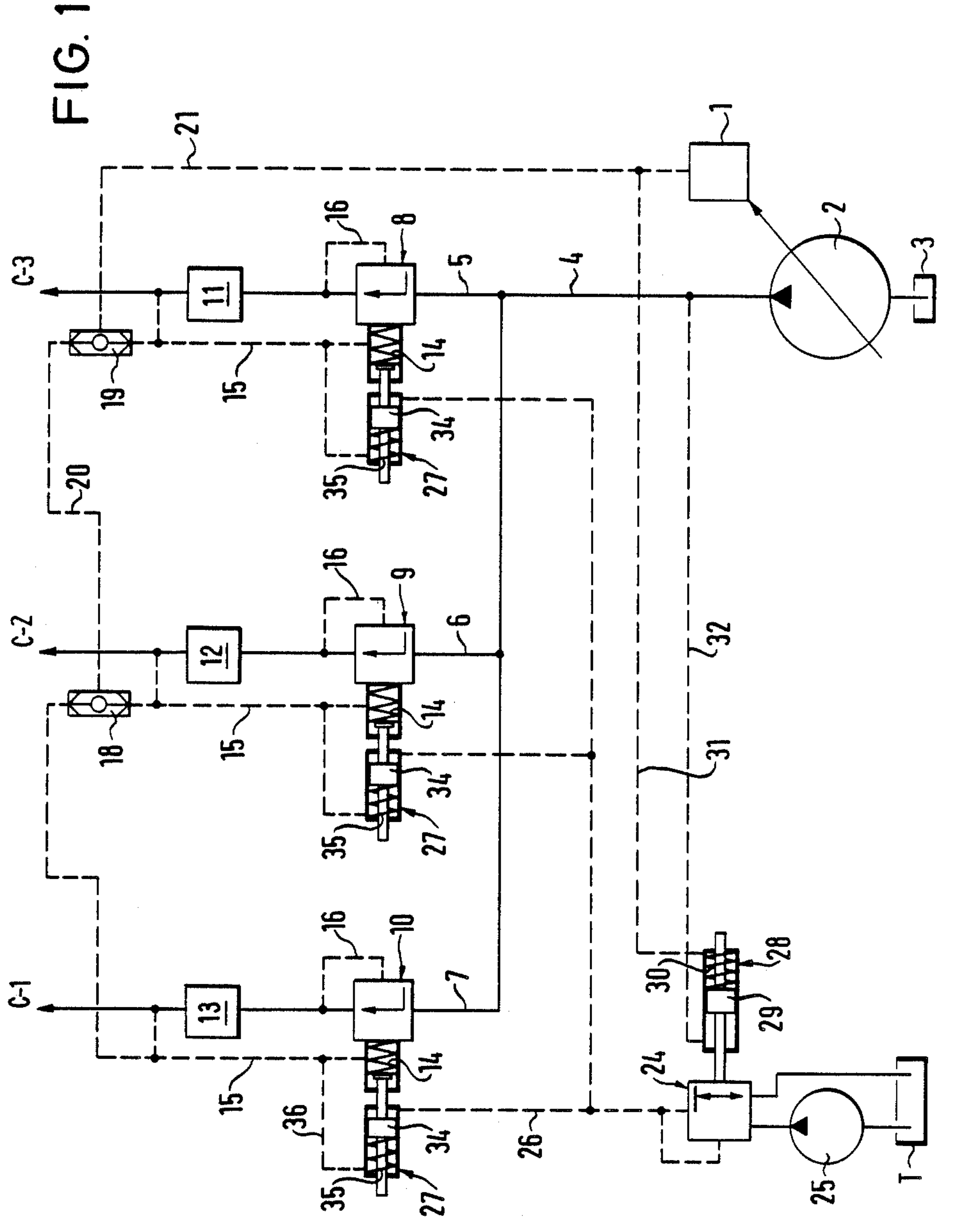
FIG. 1 is a circuit diagram of the hydraulic control arrangement.

A pump 2 adjustable in displacement by means of a delivery flow regulator 1 extracts fluid from a tank 3 and pumps it to a line 4 which is divided according to FIG. 1 into three branch lines 5, 6 and 7. Each branch line leads to a pressure balance 8, 9, 10 and via a directional valve 11, 12, 13 to a respective consumer C-1, C-2 and C-3 in each case, such as for example a lifting cylinder which is not illustrated. The directional valves are conventional three-position/five-connection valves which control the fluid paths between the associated consumer and the pump 2 or a tank as illustrated in more detail in FIG. 2. The pressure balances 8 to 10 are also of conventional design with flow control valves in which the control piston is subjected in the opening direction to the pressure of a control spring 14 and to the pressure on the output side of the directional valve via a line 15 and in the closure direction to the pressure on the input side of the directional valve via the line 16.

Thus, the flow of the fluid from the respective branch line to the directional valve and to the consumer is independent of the pressure difference obtaining between the input and the output of the directional valve. This means that the volume flow set remains constant even on pressure fluctuations so that in spite of different loads at the consumer the working speed thereof is kept constant by changing the flow in the pressure balance.

Since the springs 14 and lines 15, 16 of the individual pressure balances 8, 9 and 10 correspond to each other they are provided in the drawings with the same reference numerals.

The delivery flow regulator 1 for the variable displacement pump 2 is controlled by the highest pressure occurring at one of the loads. For this purpose a shuttle valve chain is provided which in FIG. 1 consists of the shuttle valves 18 and 19. The particular higher pressure at the output of the directional valves 12 and 13, i.e. the higher consumer pressure, is switched by the shuttle valve 18 to the line 20. The shuttle valve 19 compares the consumer pressure in the line 20 with the pressure at the output of the directional valve 11 and conducts the higher pressure via the line 21 to the delivery flow regulator 1 by which the displacement of the pump 2 is set corresponding to the consumer's requirements. To this extent the arrangement corresponds to the prior art.

In addition a pressure regulating valve 24 is provided which is connected to a pump 25, a tank T and to a line 26 which is connected to actuators 27 at each pressure balance 8 to 10. Instead of the pump 25 the connection of the pressure regulating valve 24 may also be connected to the delivery line 4. The pressure regulating valve 24 is adjusted when the predetermined pressure difference between the pump pressure and the highest pressure occurring at one of the consumers drops in order to generate on the line 26 a control pressure Δp.

For this purpose an actuator 28 is provided whose piston 29 is subjected in addition to the pressure of a spring to the highest consumer pressure in the line 21 via the line 31 and in the opposite sense to the pump pressure in the delivery line 4 via the line 32.

The actuators 27 for the pressure balances 8 to 10 are of identical design and each consist of a piston 34 acting on the control spring 14 of the associated pressure balance. In the closure direction of the pressure balance the control pressure Δp acts on the piston 34 and in the opening direction the spring 35.

The mode of operation of this additional arrangement is as follows: As long as the pump delivery in the line 4 is sufficient to actuate the connected consumers with the desired speed the pressure regulating valve 24 is closed; the pressure Δp is zero and the pressure balance spring 14 is additionally biased by the spring 35.

If however the delivery of the pump 2 does not suffice to drive the actuated consumers then in accordance with the drop of the pressure difference between the highest load pressure in the line 31 and the pump pressure in the line 32 the pressure regulating valve 24 is adjusted and the control pressure in the line 26 increased. As a result via the actuators 27 the flow to all the consumers is proportionally reduced because at all pressure balances a smaller but everwhere equal control pressure arises. The pressure difference between the highest consumer pressure and the pump pressure at which the control pressure required for throttling the pressure balances is generated is defined by the spring 30 in the actuator 28. If the pressure difference drops below the value predetermined by the spring 30 the control pressure acting on the pistons of the pressure balances is increased so that at all the consumers the flow rates are reduced in the set proportion to each other so that the path curve set for example by two lifting cylinders of a tool or working medium is retained and only the passage speed is correspondingly reduced.

It is possible to fit the actuators 27 subsequently to the pressure balances without having to change the known design of the pressure balances.

Figure 2:
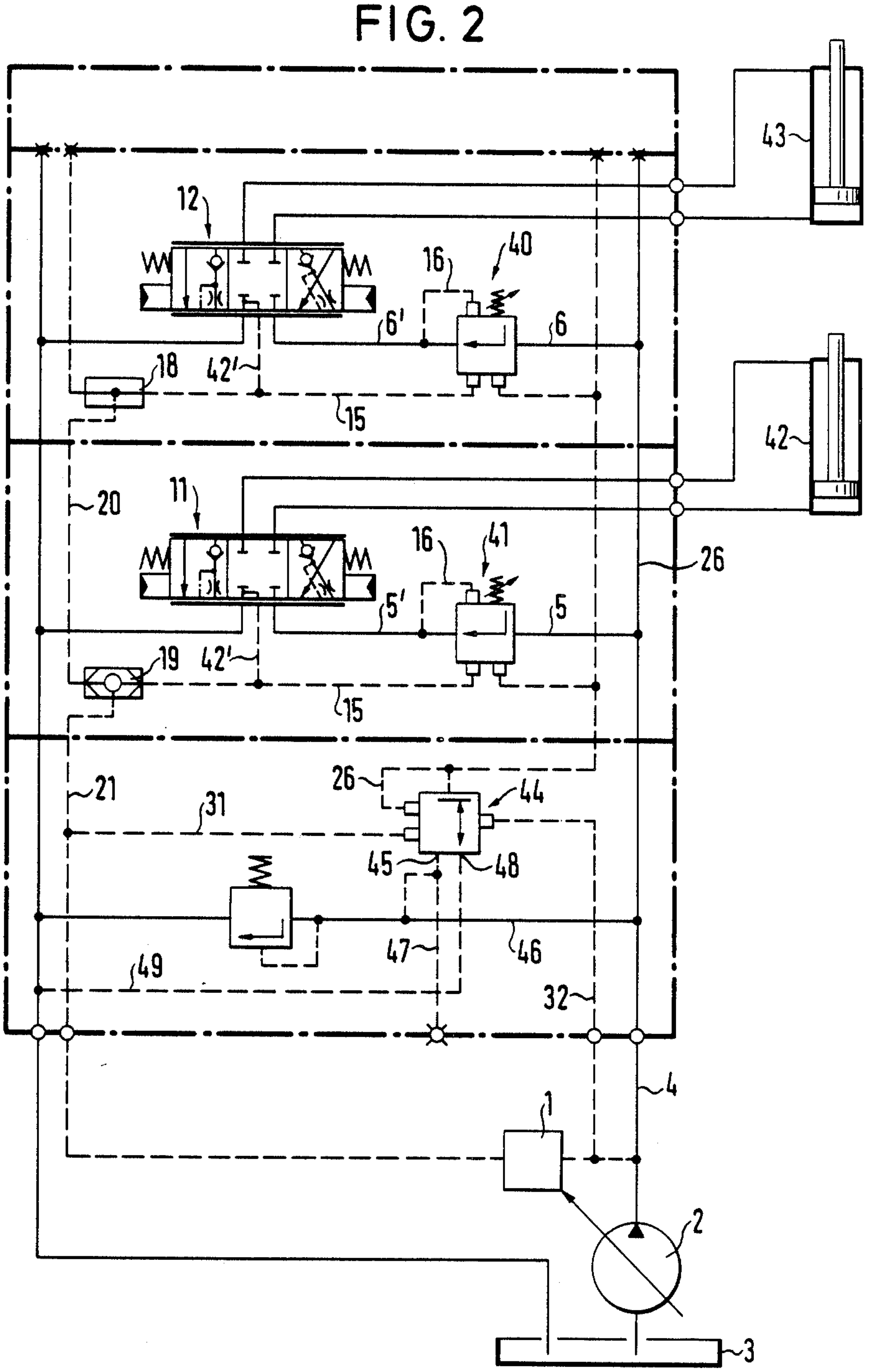
FIG. 2 is a circuit diagram of a modified control arrangement.

FIG. 2 shows a modified embodiment of the control arrangement. An adjusting of variable displacement pump 2 with a delivery flow regulator 1 once again pumps fluid from a tank 3 to a delivery line 4 from which fluid can flow via branch lines 5 and 6, pressure balances 40 and 41 and directional valves 11 and 12 to lifting cylinders 42 and 43 respectively.

The control piston of each pressure balance 40, 41 is subjected in the manner already outlined with reference to FIG. 1 via in each case a line 16 to the pressure at the input of the directional valve and in the opposite direction via a line 15 to the consumer pressure at the output of the associated directional valve. The line 15 is connected in each case to a particular control connection 42' at the directional valve 11 or 12.

Furthermore, the highest load pressure at the lifting cylinder 42 or 43 is detected by means of the shuttle valves 18 and 19 which are connected together via the line 20 so that in the line 21 the particular highest load pressure arises which is led to the delivery flow regulator 1 of the adjusting pump 2 and also to a pressure regulating valve 44 which generates the control pressure Δp which is led via the common line 26 to all the pressure balances 40 and 41.

Corresponding to the pressure regulating valve 24 in FIG. 1 the regulating piston of the pressure regulating valve 44 in FIG. 2 is also subjected to in opposite directions to the differential pressure between the pump pressure in the line 32 connected to the delivery line 4 and the particular highest consumer pressure obtaining in the branch line 31. The pressure connection 45 of the pressure regulating valve 44 may be connected selectively via 46 to the pump delivery line 4 or via the line 47 to a control fluid source. The connection 48 is connected via the line 49 to the tank 3.

However, in contrast to FIG. 1 each pressure balance 40, 41 comprises an additional control chamber which is connected to the line 26. The control pressure Δp acts on the control piston of each balance in the same sense as the consumer pressure and in the opposite sense to the pressure at the input of the associated directional valve.

The absolute control pressure Δp which is generated in the pressure regulating valve 44 from the differential pressure between the highest consumer pressure and the pump pressure and which maintains equilibrium with the differential pressure of pump pressure and highest consumer pressure of the respective consumer is applied to each additional control chamber at each pressure balance 40, 41. If due to inadequate pump power the pressure difference drops the flow in each pressure balance 40, 41 is proportionally reduced for all consumers because at all pressure balances a smaller but everywhere equal control pressure Δp arises.

Figure 3:
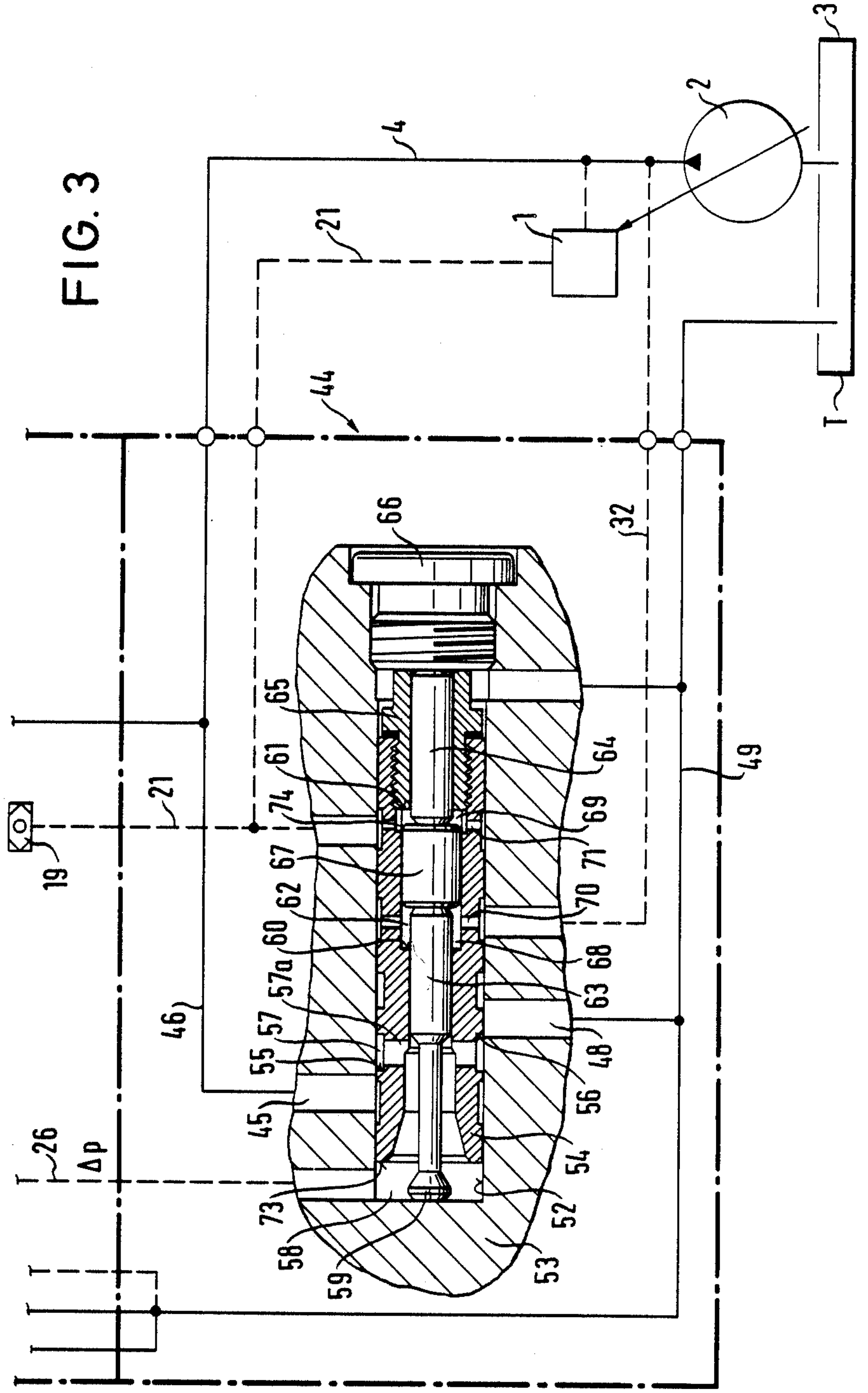
FIG. 3 is a partial section through a pressure regulating valve for generating a pressure difference and FIG. 4 is a partial section through a pressure balance for use in the control arrangement according to FIG. 2.

FIG. 3 illustrates an advantageous design for the pressure regulating valve 44. To facilitate understanding the same reference numerals are used as in FIG. 2.

In a bore 52 in the housing 53 of the pressure regulating valve 44 a control piston 54 is displaceably mounted which forms at 55 and 56 in each case a control edge which sets the throttle cross-section for the admission of pump fluid from the line 46 via the connection 45, via radial bores 57 in an end chamber 58 and the discharge from the end chamber 58 via the radial bores 57 to the port or connection 48 connected to the tank line 49. In accordance with the position of the control piston 54 in the end chamber 58 in this manner the control pressure Δp is generated which is applied via the common line 26 to the pressure balances 40, 41.

The control piston 54 comprises an adjusting face 60 subjected to the pump pressure in the line 32 and an adjusting face 61 subjected in the opposite sense to the highest consumer pressure in the line 21. The adjusting face 60 is defined by the diameter of the inner bore 62 in the control piston 54 and by the diameter of a piston 63 which is fixed with respect to the housing and which with an extension 59 is supported in the end chamber 58 at the housing 53.

The adjusting face 61 is likewise defined by the diameter of the inner bore 62 of the control piston and the diameter of a second piston 64 which is fixed with respect to the housing and which is mounted in a sleeve 65 screwed to the control piston and bears with its right end on the screw 66 closing the housing 53. Between the two pistons 63 and 64 a separating piston 67 is provided which divides the control chambers 68 and 69 from each other, said chambers being associated with the adjusting faces 60 and 61 and communicating via bores 70 and 71 in the control piston 54 to the line 32 and the line 21 respectively.

Corresponding to the pressures obtaining on the adjusting faces 60, 61 in this manner the control piston 54 is displaced along the stationary pistons 63, 64 and 67 and sets the control pressure Δp via the throttle cross-section 55 and 56 respectively. The pump pressure acting on the adjusting face 60 results in a movement of the control piston 54 in the opening sense at the control edge 55, i.e. leads to an increase in the control pressure Δp, whilst the highest consumer pressure acting on the control adjusting face 61 via the control edge 56 results in a reduction in the control pressure. The control pressure itself acts on the end face 73, facing the chamber 58, of the control piston 54, the area of which depends on the diameter of the bore 52 and the diameter of the piston 63.

The design of the pressure regulating valve is distinguished above all by consisting of parts which are simple to make because no stepped pistons are used; on the contrary, the adjusting faces depend on the pistons 63, 64, 67 of different diameter with the corresponding diameters in the interior of the control piston. Furthermore, the danger of seizure of the control piston is substantially reduced.

Figure 4:
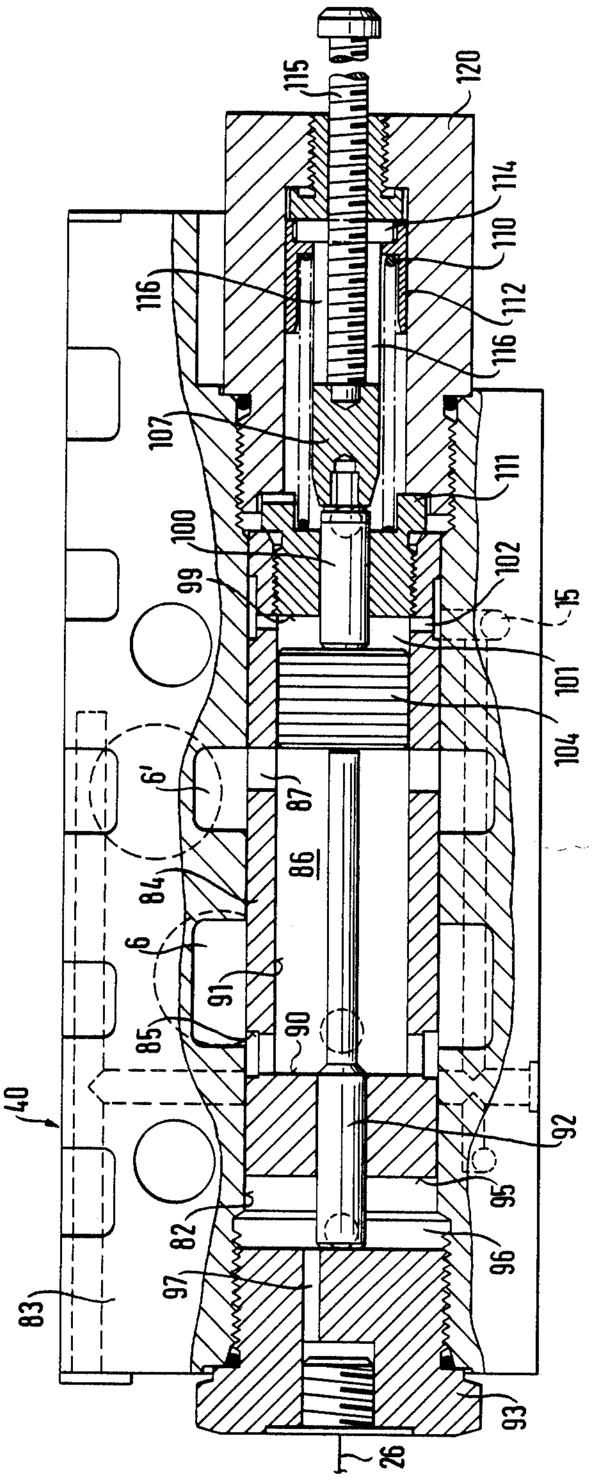

FIG. 4 shows a section through the pressure balance 40 whose mode of operation has been explained with the aid of FIG. 2 and in which a similar constructional principle is used as in the pressure regulating valve 44.

In a continuous bore 82 in the housing 83 of the pressure balance 40 a control piston 84 is displaceable mounted which has a control edge 85 by which the flow cross-section from the branch line 6 connected to the pump delivery line 4 to an inner chamber 86 of the control piston 84 is defined. The fluid flows from the chamber 86 through the always open cross-section 87 into the line 61 leading to the directional valve 12; thus, in the chamber 86 the pressure acts which is present at the input of the directional valve 12 and acts on adjusting face 90 which is defined by the diameter of the inner bore 91 of the control piston 84 and the diameter of a piston 92 which is fixed with respect to the housing and traverses the control piston and with its left end bears on the screw 93 sealing the housing 83.

A further adjusting face 95 is defined by the bore diameter 82 and the diameter of the piston 92 and faces a chamber 96 which is connected via a bore 97 to the line 26 carrying the control pressure Δp.

A further adjusting face 99 of the control piston 84 is defined by the diameter of a further piston 100 fixed with respect to the housing and by the diameter of the bore 91. The adjusting face 99 faces a chamber 101 which is connected via bores 102 to the line 15 in which the consumer pressure tapped off at the control connection 42 of the directional valve 12 obtains.

The two chambers 86 and 101 are separated by a separating piston 104. The pistons 92, 100 and 104 are in turn supported at both ends at the housing. The piston 92 bears on the closure plug 93 and the piston 100 on a member 107 which in turn is screwed into the housing closure portion 120 at its right end. The force exerted by the control pressure Δp on the adjusting face 95 can be adjusted by a spring 110 whose left end bears on a bush 111 sealing the control piston 84 and whose right end bears on a holder 112 which bears on a transverse pin 114 which is displaceable by means of a set screw 115 screwed to the member 107. The pin 114 traverses a longitudinal slot 116 in the member 107.

If the displacement of the pump suffices the control pressure Δp has a magnitude resulting in accordance with the pressure difference set at the pump regulator 1 from the pump pressure and highest consumer pressure and the selected area ratios in the pressure regulating valve 44. If however because of inadequate pump delivery the pressure difference set cannot be maintained the pressure generated in the pressure regulating valve 44 is also reduced and this leads to a reduction of the flow rate in the directional valves 11 and 12.

The adjusting faces at the pressure regulating valve and at the pressure balance must each be chosen in magnitude so that the desired forces result. Since this is a question of dimensioning only no further explanation is required. The piston 92 bears on the closure plug 98.

We claim:

1. Control arrangement for a system having at least two hydraulic consumers, at least one pump, respective direction and speed controlling valve means associated between said pump and each consumer, and a respective pressure balance for setting a load-independent flow to said directional and speed controlling valve means, said pressure balance being subjected to a first pressure difference between the input and the output of the associated directional valve when the pump displacement is adequate and to a second lower pressure difference for reducing the flow when the pump displacement is inadequate, characterized in that the second pressure difference is generated by a pressure regulating valve controlled by the pump pressure and highest consumer pressure and provides a control pressure output led jointly to all said pressure balances.

2. Control arrangement according to claim 1, characterized in that each pressure balance is provided with an actuator which acts on a control piston thereof and further includes another piston subjected to the second pressure difference.

3. Control arrangement according to claim 2, characterized in that the piston of the actuator acts on a control pressure spring of the pressure balance.

4. Control arrangement according to claim 3, characterized in that the control pressure spring is biased by the actuator piston and by a pressure spring and the actuator piston is subjected to pressure against the force of the pressure spring for reducing the biasing of the control pressure spring.

5. Control arrangement according to claim 1, characterized in that each pressure balance includes a control piston an additional control pressure chamber subjected to the second pressure difference.

6. Control arrangement according to claim 5, characterized in that the pressure balance includes a control piston having adjusting faces subjected to the pressure differences, said control piston having constant outer diameter and its effective areas defined by pistons fixed with respect to a housing and supported at both ends therein and have different diameters received in stepped bores of said control piston.

7. Control arrangement according to claim 6, characterized in that the adjusting face of the control piston subjected to the second pressure difference, is an end annular face formed by the outer diameter of the control piston and a first piston fixed with respect to the housing, the adjusting face subjected to the pressure at the input of the associated directional valve being defined by an annular face formed by the internal diameter of a borė provided for passage of the delivery to the directional valve in the control piston and the first piston, and that the adjusting face subjected to the pressure at the output of the associated directional valve being defined by the annular face formed by the internal diameter of a bore in the control piston and a second piston fixed with respect to the housing.

8. Control arrangement according to claim 7, characterized in that the first and second pistons are fixed with respect to the housing with a separating piston disposed between them.

9. Control arrangement according to claim 6 characterized in that an adjustable spring acts on the control piston against the second pressure difference.

10. Control arrangement according to claim 1 characterized in that the pressure regulating valve has adjusting faces subjected to the pump pressure, the highest load pressure and the second pressure difference, respectively, said pressure regulating valve comprising a cylindrical constant outer diameter control piston having the effective areas of said adjusting faces defined by pistons fixed with respect to a housing and supported therein at both ends and having different diameters received in stepped bores of said control piston.

11. Control arrangement according to claim 10, characterized in that the control cross-section of the pressure regulating valve between a housing-side connectin to the pump and a tank is formed by an annular groove in the control piston connected via radial bores in the control piston to an end chamber in which the second pressure difference is transmitted and which acts on an annular face formed by the external diameter of the control piston and a first piston fixed with respect to the housing.

12. Control arrangement according to claim 11, characterized in that oppositely to the second pressure difference an annular face is formed by the first piston and an inner bore of the control piston is subjected to the pump pressure and in the same sense as the second pressure difference an annular face is formed by a second piston fixed with respect to the housing and a stepped bore of the control piston which is subjected to the particular highest load pressure.

13. Control arrangement according to claim 12, characterized in that between the first and the second pistons a separating piston is provided.

14. Control arrangement according to claim 1 wherein at least one pump is provided with a pump displacement regulator for adjusting the displacement of said one pump and further comprising a shuttle valve chain for applying the highest pressure occurring at one of the consumers to the pump displacement regulator as command signal.

* * * * *